(12) United States Patent
He et al.

(10) Patent No.: US 12,735,347 B2
(45) Date of Patent: Sep. 15, 2026

(54) SOLAR DARK GREEN GLASS

(71) Applicant: FUYAO GLASS INDUSTRY GROUP CO., LTD., Fuqing (CN)

(72) Inventors: Shimeng He, Fuqing (CN); Guoshu Chen, Fuqing (CN); Rubin Xu, Fuqing (CN); Jianguang Guan, Fuqing (CN); Qinglin Yang, Fuqing (CN); Suquan Ye, Fuqing (CN); Zhaofeng Lian, Fuqing (CN); Kaifu Lin, Fuqing (CN); Xiangzhi Luo, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 485 days.

(21) Appl. No.: 18/279,691

(22) PCT Filed: Mar. 10, 2022

(86) PCT No.: PCT/CN2022/080070
§ 371 (c)(1),
(2) Date: Aug. 31, 2023

(87) PCT Pub. No.: WO2022/188826
PCT Pub. Date: Sep. 15, 2022

(65) Prior Publication Data

US 2024/0158286 A1 May 16, 2024

(30) Foreign Application Priority Data

Mar. 10, 2021 (CN) ......................... 202110260465.0

(51) Int. Cl.
*C03C 4/02* (2006.01)
*B60J 1/00* (2006.01)
(Continued)

(52) U.S. Cl.
CPC ..................................... *C03C 4/02* (2013.01); *B60J 1/00* (2013.01); *C03C 3/087* (2013.01); *C03C 4/082* (2013.01); *C03C 4/085* (2013.01); *C03C 4/10* (2013.01)

(58) Field of Classification Search
CPC ............ C03C 4/02; C03C 3/087; C03C 4/082
See application file for complete search history.

(56) References Cited

U.S. PATENT DOCUMENTS 7,825,051 B2 * 11/2010 Smith ..................... C03C 1/002 501/71
8,318,054 B2 * 11/2012 Cid-Aguilar ............ C03C 3/087 252/588
(Continued)

FOREIGN PATENT DOCUMENTS

CN 1746124 A * 3/2006
CN 105923993 A 9/2016
(Continued)

OTHER PUBLICATIONS

Notice of Reasons for Refusal dated Jun. 12, 2024 received in Japanese Patent Application No. 2023-551974.
(Continued)

*Primary Examiner* — Noah S Wiese
(74) *Attorney, Agent, or Firm* — Scully, Scott, Murphy & Presser, P.C.

(57) ABSTRACT

A solar dark green glass and a vehicle are provided. The solar dark green glass includes a glass basic component and a glass tinted component. The solar dark green glass includes a glass basic component and a mass tinted component. The glass tinted component includes, as percentages by weight, 0.8%-2.0% total iron expressed as $Fe_2O_3$, 0.01%-0.6% $TiO_2$, 0.001%-2.0% $CeO_2$, 5 ppm-150 ppm $Cr_2O_3$, 15 ppm-60 ppm $Zro_2$, 2 ppm-1000 ppm CuO, 5 ppm-50 ppm SrO, 80 ppm-200 ppm BaO, and 5 ppm-120 ppm $Co_2O_3$. A content of total iron expressed as $Fe_2O_3$ and a content of
(Continued)

$TiO_2$ total 1.0%-2.0%, and the content of $TiO_2$ and a content of $CeO_2$ total 0.2%-2.1%. The solar dark green glass manufactured has a thickness of 1.6 mm-2.1 mm, and solar direct transmittance less than or equal to 65%, infrared transmittance less than or equal to 45%, and ultraviolet transmittance less than or equal to 35%.

18 Claims, 1 Drawing Sheet

(51) Int. Cl.
*C03C 3/087* (2006.01)
*C03C 4/08* (2006.01)
*C03C 4/10* (2006.01)

(56) References Cited

U.S. PATENT DOCUMENTS 9,573,841 B1 2/2017 Cid-Aguilar et al.
2002/0058579 A1 5/2002 Seto et al.
2011/0297900 A1* 12/2011 Cid-Aguilar ............ C03C 4/085 252/588
2014/0154440 A1* 6/2014 Iida ......................... C03C 3/093 428/34.4
2018/0072611 A1* 3/2018 Akada ..................... C03C 3/087
2018/0170797 A1 6/2018 Gorecki et al.

FOREIGN PATENT DOCUMENTS

CN 107032601 A 8/2017
CN 107777873 A 3/2018
CN 110642513 A 1/2020
CN 111777326 A * 10/2020 ........... C03C 21/001
EP 3070061 A1 9/2016
JP 2004123495 A 4/2004
JP 2005512932 A 5/2005
JP 2013209224 A 10/2013
JP 2020528865 A 10/2020
WO WO-2018117193 A1 * 6/2018 ............. C03C 4/085

OTHER PUBLICATIONS

International Search Report dated Jun. 8, 2022 issued in PCT/CN2022/080070.
Chinese First Office Action dated Jan. 30, 2022 issued in CN 202110260465.0.
Chinese Second Office Action dated Jul. 6, 2022 issued in CN 202110260465.0.
Extended European search report issued in corresponding European application No. 22766348.1 dated Feb. 14, 2025.

* cited by examiner

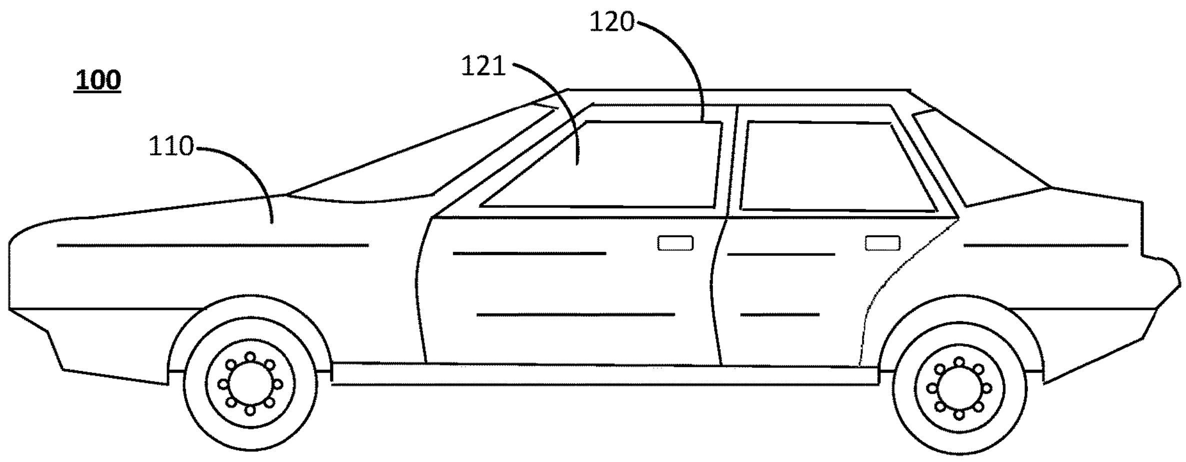
100
110
121
120

SOLAR DARK GREEN GLASS

CROSS-REFERENCE TO RELATED APPLICATION(S)

This application is a National Stage of International Application No. PCT/CN2022/080070, filed Mar. 10, 2022, which claims priority to Chinese Patent Application No. 202110260465.0, filed Mar. 10, 2021, the entire disclosures of which are hereby incorporated by reference.

TECHNICAL FIELD

This disclosure relates to the field of float glass technology, and in particular to a solar dark green glass having lower infrared transmittance and lower ultraviolet transmittance.

BACKGROUND

Glass products are widely used in industries such as building, vehicle, daily use, medical, chemical, household, electronic, and instrument. With advancement of production technology, requirements for performance and color of the glass products have been continuously increased and satisfied, and glass of different color has been gradually applied to more middle-high-end and special-performance vehicles. The optical change of the glass gives different color and performance to the glass. In an application of vehicle glass, a dark glass product can be used as a side window glass, a rear window glass, a panoramic sunroof, etc. of a vehicle, so as to protect privacy of a space inside the vehicle and achieve a purpose of reducing incidence of infrared rays and ultraviolet rays, such that the inside of the vehicle is more comfortable.

A green glass used in a prior vehicle can also achieve the purpose of reducing the transmission of infrared rays and ultraviolet rays to a certain extent, but the green glass generally has a relatively large thickness, for example, greater than 2.1 mm, and cannot satisfy requirements for having lower infrared transmittance and lower ultraviolet transmittance after being thinned due to requirements for vehicle weight reduction.

SUMMARY

A solar dark green glass includes a glass basic component and a glass tinted component. The glass tinted component includes, as percentages by weight, 0.8%-2.0% total iron expressed as $Fe_2O_3$, 0.01%-0.6% titanium dioxide ($TiO_2$), 0.001%-2.0% cerium oxide ($CeO_2$), 5 parts per million (ppm)-150 ppm chromium(III) oxide ($Cr_2O_3$), 15 ppm-60 ppm zirconium dioxide ($ZrO_2$), 2 ppm-1000 ppm copper(II) oxide (CuO), 5 ppm-50 ppm strontium oxide (SrO), 80 ppm-200 ppm barium oxide (BaO), and 5 ppm-120 ppm cobalt(III) oxide ($Co_2O_3$). A content of total iron expressed as $Fe_2O_3$ and a content of $TiO_2$ total 1.0%-2.0%, and the content of $TiO_2$ and a content of $CeO_2$ total 0.2%-2.1%. The solar dark green glass has a thickness of 1.6 mm-2.1 mm, and solar direct transmittance less than or equal to 65%, infrared transmittance less than or equal to 45%, and ultraviolet transmittance less than or equal to 35%.

A vehicle is further provided in the present disclosure. The vehicle includes a vehicle body and a vehicle window. The vehicle window is disposed at the vehicle body. The vehicle window includes a solar dark green glass. The solar dark green glass includes a glass basic component and a glass tinted component. The glass tinted component includes, as percentages by weight, 0.8%-2.0% total iron expressed as $Fe_2O_3$, 0.01%-0.6% $TiO_2$, 0.001%-2.0% $CeO_2$, 5 ppm-150 ppm $Cr_2O_3$, 15 ppm-60 ppm $ZrO_2$, 2 ppm-1000 ppm CuO, 5 ppm-50 ppm SrO, 80 ppm-200 ppm BaO, and 5 ppm-120 ppm $Co_2O_3$. A content of total iron expressed as $Fe_2O_3$ and a content of $TiO_2$ total 1.0%-2.0%, and the content of $TiO_2$ and a content of $CeO_2$ total 0.2%-2.1%. The solar dark green glass has a thickness of 1.6 mm-2.1 mm, and solar direct transmittance less than or equal to 65%, infrared transmittance less than or equal to 45%, and ultraviolet transmittance less than or equal to 35%.

BRIEF DESCRIPTION OF THE DRAWINGS

To describe technical solutions in implementations of the present disclosure more clearly, the following describes the accompanying drawings required for describing implementations of the present disclosure.

FIG. 1 is a schematic diagram of a vehicle in an implementation of the present disclosure.

REFERENCE SIGNS

100—vehicle, 110—vehicle body, 120—vehicle window, 121—solar dark green glass.

DETAILED DESCRIPTION

To describe the technical content, the purpose, and the effect of the present disclosure in detail, the following describes the technical content with reference to implementations.

The term "implementation" referred to herein means that a particular feature, structure, or characteristic described in conjunction with the implementation may be contained in at least one implementation of the present disclosure. The phrase "implementation" appearing in various places in the specification does not necessarily refer to the same implementation, nor does it refer to an independent or alternative implementation that is mutually exclusive with other implementations. It is expressly and implicitly understood by those skilled in the art that implementations described herein may be combined with other implementations.

A solar dark green glass is provided in the present disclosure. The solar dark green glass includes a glass basic component and a glass tinted component. The glass basic component includes, as percentages by weight, 63%-73% silicon dioxide ($SiO_2$), 10%-18% sodium oxide ($Na_2O$), 4%-14% calcium oxide (CaO), 2%-6% magnesium oxide (MgO), 0.1%-2% aluminium oxide ($Al_2O_3$), and 0.01%-1% potassium oxide ($K_2O$). A weight percentage of $Na_2O$ may be, but is not limited to, 10%, 11%, 12%, 13%, 14%, 15%, 16%, 17%, or 18%. In the glass, $Na_2O$ can reduce high-temperature viscosity of the glass, reduce a change threshold of a structure of the tinted component, and increase a coefficient of thermal expansion (CTE) of the glass. If the content of $Na_2O$ is too low, a melting ability of the glass raw material may be reduced; and if the content of $Na_2O$ is too high, weather resistance of the glass may be reduced.

A weight percentage of $K_2O$ may be, but is not limited to, 0.01%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, or 1%. $K_2O$ and $Na_2O$ belong to alkali metal oxides, and a function of $K_2O$ is also similar to a function of $Na_2O$. If the sum of the content of $Na_2O$ and the content of $K_2O$ is too low, the melting ability of the glass raw material may be reduced; and if the sum of the content of $Na_2O$ and the content of $K_2O$ is too high, chemical stability of the glass is reduced, the weather resistance of the glass is reduced, and production costs of the glass are increased.

A weight percentage of CaO may be, but is not limited to, 4%, 5%, 6%, 7%, 8%, 9%, 10%, 11%, 12%, 13%, or 14%. CaO can improve stability of the glass and devitrification resistance of the glass, reduce the high-temperature viscosity of the glass. If the content of CaO is too high, the glass may be devitrified, and the stability of the glass is reduced; and if the content of CaO is too low, the melting ability of the raw glass material may be reduced.

A weight percentage of MgO may be, but is not limited to, 2%, 2.5%, 3%, 3.5%, 4%, 4.5%, 5%, 5.5%, and 6%. MgO can improve the chemical stability of the glass and facilitate the melting ability of the glass raw material. If the content of MgO is too high, the devitrification resistance of the glass is reduced, such that the glass may be devitrified, and the stability of glass is reduced; and if the content of MgO is too low, the melting ability of the glass raw material may be reduced.

A weight percentage of $Al_2O_3$ may be, but is not limited to, 0.1%, 0.3%, 0.5%, 0.7%, 0.9%, 1.1%, 1.3%, 1.5%, 1.7%, 1.9%, or 2%. In the glass, $Al_2O_3$ can also improve the chemical stability of the glass. If the content of $Al_2O_3$ is too low, the weather resistance of the glass is reduced; and if the content of $Al_2O_3$ is too high, the glass raw material will be difficult to melt.

$SiO_2$ is a main component of the glass, and has relatively stable chemical properties, so that the glass has good weather resistance. In the present disclosure, a weight percentage of $SiO_2$ may be, but is not limited to, 63%, 64%, 65%, 66%, 67%, 68%, 69%, 70%, 71%, 72%, or 73%. In the present disclosure, if the content of $SiO_2$ is too low, the weather resistance of the glass is reduced, and the glass raw material is difficult to melt.

The glass tinted component includes, as percentages by weight, 0.8%-2.0% total iron expressed as $Fe_2O_3$, 0.01%-0.6% titanium dioxide ($TiO_2$), 0.001%-2.0% cerium oxide ($CeO_2$), 5 parts per million (ppm)-150 ppm chromium(III) oxide ($Cr_2O_3$), 15 ppm-60 ppm zirconium dioxide ($ZrO_2$), 2 ppm-1000 ppm copper(II) oxide (CuO), 5 ppm-50 ppm strontium oxide (SrO), 80 ppm-200 ppm barium oxide (BaO), and 5 ppm-120 ppm cobalt(III) oxide ($Co_2O_3$).

A weight percentage of total iron expressed as $Fe_2O_3$ may be, but is not limited to, 0.8%, 0.9%, 1.0%, 1.1%, 1.2%, 1.3%, 1.4%, 1.5%, 1.6%, 1.7%, 1.8%, 1.9%, or 2.0%. Total iron expressed as $Fe_2O_3$ is used as a main tinting agent (i.e., colorant) for tinting green of the glass and adjusting transmittance of the glass. Total iron expressed as $Fe_2O_3$ exists in the form of ferrous iron ($Fe^{2+}$) and ferric iron ($Fe^{3+}$), etc., the ferrous iron ($Fe^{2+}$) can be used as an infrared absorption component, and the ferric iron ($Fe^{3+}$) can be used as an ultraviolet absorption component. If the content of total iron expressed as $Fe_2O_3$ is too low, the infrared absorption performance and the ultraviolet absorption performance may be reduced. If the content of total iron expressed as $Fe_2O_3$ is too high, the visible light transmittance of the glass is reduced. In the present disclosure, total iron expressed as $Fe_2O_3$ refers to all iron oxides present in the glass, including both ferrous iron (i.e., FeO) and ferric iron (i.e., $Fe_2O_3$), which is an universal expression method in the art, and does not mean that all iron oxides in the glass are iron(III) oxide $Fe_2O_3$.

In the present disclosure, a ratio of a weight content of ferrous iron expressed in the form of FeO to a weight content of total iron expressed in the form of $Fe_2O_3$ is defined as a redox ratio, which is used for adjusting the ultraviolet transmittance and the infrared transmittance. The redox ratio of the solar dark green glass is 0.1-0.5, and specifically, such as, 0.17, 0.19, 0.23, 0.24, 0.25, 0.31, 0.37, 0.46, 0.49, etc. If the redox ratio is too low, it indicates that the content of ferrous iron in the glass is too low, such that the infrared absorption ability of the glass is weak; and if the redox ratio is too high, it indicates that the content of ferrous iron in the glass is too high, such that the melting difficulty of the glass raw material is increased and the glass is bluish.

A weight percentage of $TiO_2$ may be, but is not limited to, 0.01%, 0.05%, 0.1%, 0.15%, 0.2%, 0.25%, 0.3%, 0.35%, 0.4%, 0.45%, 0.5%, 0.55%, or 0.6%. $TiO_2$ can enable the glass to have ultraviolet blocking performance and serve as a yellow tinting agent. Optionally, the content of total iron expressed as $Fe_2O_3$ and the content of $TiO_2$ are 1.0%-2.0%, and the content of total iron expressed as $Fe_2O_3$ and the content of $TiO_2$ may be, but are not limited to, 1.0%, 1.1%, 1.2%, 1.3%, 1.4%, 1.5%, 1.6%, 1.7%, 1.8%, 1.9%, or 2.0%. If the content of total iron expressed as $Fe_2O_3$ and the content of $TiO_2$ are too low, the beneficial effect on the glass is not obvious; and if the content of total iron expressed as $Fe_2O_3$ and the content of $TiO_2$ are too high, the devitrification resistance of the glass is reduced.

A weight percentage of $CeO_2$ may be, but is not limited to, 0.001%, 0.005%, 0.01%, 0.015%, 0.02%, 0.03%, 0.04%, 0.05%, 0.06%, 0.1%, 0.15%, 0.2%, 0.25%, 0.3%, 0.35%, 0.4%, 0.45%, 0.5%, 1.0%, 1.5%, or 2.0%. $CeO_2$ can enable the glass to have the ultraviolet blocking performance and serve as a yellow tinting. If the content of $CeO_2$ is too low, the beneficial effect on the glass is not obvious; and if the content of $CeO_2$ is too high, the production costs of the glass are greatly increased, the production efficiency is reduced, and the glass is made yellowish. Optionally, the content of titanium oxide $TiO_2$ and the content of $CeO_2$ is 0.2%-2.1%. In the present disclosure, the content of $TiO_2$ and the content of $CeO_2$ may be, but are not limited to, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0%. If the content of $TiO_2$ and the content of $CeO_2$ are too high, the devitrification resistance of the glass is reduced; and if the content of $TiO_2$ and the content of $CeO_2$ are too low, the beneficial effect on the glass is not obvious.

Optionally, when the content of $TiO_2$ is greater than or equal to 0.2%, from consideration of manufacturing convenience and economy, a ratio of the content of $TiO_2$ to the content of $CeO_2$ is greater than or equal to 20, such as, 20, 21, 22, 23, 24, 25, 26, 27, 28, 29, 30, 40, etc., and more preferably, 20 to 28. When the content of $TiO_2$ is greater than or equal to 0.2%, the content of $TiO_2$ is greater than the content of $CeO_2$. In this case, if the ratio of the content of $TiO_2$ to the content of $CeO_2$ is less than 20, ultraviolet blocking performance of the glass is reduced.

Optionally, when the content of $TiO_2$ is less than 0.1%, from the consideration of manufacturing convenience and economy, a ratio of the content of $CeO_2$ to the content of $TiO_2$ is 5-40, such as, 5, 6, 7, 8, 10, 15, 20, 25, 30, 35, 40, etc. When the content of $TiO_2$ is less than 0.1%, the content of $TiO_2$ is less than the content of $CeO_2$. If the ratio of the content of $CeO_2$ to the content of $TiO_2$ is less than 5 at this time, the ultraviolet blocking performance of the glass cannot satisfy the design requirements; and if the ratio of the content of $CeO_2$ to the content of $TiO_2$ is greater than 40 at this time, the glass can be easily devitrified and even ceramic.

A weight percentage of $Cr_2O_3$ may be, but is not limited to, 5 ppm, 10 ppm, 20 ppm, 30 ppm, 40 ppm, 50 ppm, 60 ppm, 70 ppm, 80 ppm, 90 ppm, 100 ppm, 110 ppm, 120 ppm, 130 ppm, 140 ppm, or 150 ppm. $Cr_2O_3$ can enable the glass to have the ultraviolet blocking performance and serve as a yellow-green and emerald tinting agent.

A weight percentage of CuO may be, but is not limited to, 2 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm. CuO can serve as a cyan tinting agent. Optionally, the content of CuO is 100 ppm-800 ppm. From the consideration of manufacturing convenience and economy, optionally, a ratio of the content of CuO to the content of $Cr_2O_3$ content is 5 to 60, such as, 5, 10, 15, 20, 25, 30, 35, 40, 45, 50, 55, 60, etc.

A weight percentage of $Co_2O_3$ may be, but is not limited to, 5 ppm, 10 ppm, 20 ppm, 30 ppm, 40 ppm, 50 ppm, 60 ppm, 70 ppm, 80 ppm, 90 ppm, 100 ppm, 110 ppm, or 120 ppm. $Co_2O_3$ is used as a light blue tinting agent for the glass, which can be used for adjusting the color of the glass, and $Co_2O_3$ itself also has a certain infrared absorption function. If the content of $Co_2O_3$ is too low, the beneficial effect on the glass is not obvious; and if the content of $Co_2O_3$ is too high, the devitrification resistance of the glass is weak. Optionally, the content of $Co_2O_3$ is 8 ppm-110 ppm.

A weight percentage of $ZrO_2$ may be, but is not limited to, 15 ppm, 20 ppm, 25 ppm, 30 ppm, 35 ppm, 40 ppm, 45 ppm, 50 ppm, 55 ppm, or 60 ppm. A weight percentage of BaO may be, but is not limited to, 80 ppm, 90 ppm, 100 ppm, 110 ppm, 120 ppm, 130 ppm, 140 ppm, 150 ppm, 160 ppm, 170 ppm, 180 ppm, 190 ppm, or 200 ppm. A weight percentage of SrO may be, but is not limited to, 5 ppm, 10 ppm, 15 ppm, 20 ppm, 25 ppm, 30 ppm, 35 ppm, 40 ppm, 45 ppm, or 50 ppm. A proper content of $ZrO_2$, a proper content of BaO, and a proper content of SrO can improve the chemical stability of the glass and improve hardness of the glass. If the content of $ZrO_2$, the content of BaO, and the content of SrO that are adopted are too high, an ability of the glass to fix the tinted component is reduced; and if the content of $ZrO_2$, the content of BaO, and the content of SrO are too low, the beneficial effect on the glass is not obvious. From the consideration of manufacturing convenience and economy, optionally, a ratio of the content of BaO to the content of SrO is 5-40, such as, 5.4, 6, 7, 8, 8.2, 8.3, 8.7, 9, 9.1, 9.6, 9.9, 10, 11, 12, 13, 14.9, etc. Optionally, the ratio of the content of BaO to the content of $ZrO_2$ is 2-8, such as, 2, 2.9, 3, 3.4, 3.5, 3.8, 3.9, 4.0, 4.2, 5, 6, 7, 8, etc. Optionally, the content of $ZrO_2$ may be 30 ppm-40 ppm.

From the consideration of manufacturing convenience and economy, the solar dark green glass in the present disclosure is free of nickel(II) oxide (NiO). Generally, NiO reduces the visible light transmittance of the glass, but does not reduce the infrared transmittance and the ultraviolet transmittance. In addition, NiO is easy to make glass be brownish, and may also react with molten tin in a float bath, so that the glass with a desired hue cannot be obtained.

In the present disclosure, by controlling the glass tinted component in a strict proportion, the solar dark green glass with a thickness of 1.6 mm-2.1 mm can be obtained. The thickness of the solar dark green glass may be, but is not limited to, 1.6 mm, 1.7 mm, 1.8 mm, 1.9 mm, 2.0 mm, or 2.1 mm. The solar dark green glass has the solar direct transmittance less than or equal to 65%, the infrared transmittance less than or equal to 45%, and the ultraviolet transmittance less than or equal to 35%. In some implementations, the solar direct transmittance of the solar dark green glass is less than or equal to 50%, and the infrared transmittance of the solar dark green glass is less than or equal to 30%. The solar direct transmittance may be, but is not limited to, 41%, 43%, 45%, 47%, 49%, 50%, 51%, 52%, 53%, 54%, 55%, 56%, 57%, 58%, 59%, 60%, 61%, 62%, 63%, 64%, or 65%. The infrared transmittance may be, but is not limited to, 21%, 23%, 25%, 27%, 29%, 30%, 31%, 32%, 33%, 34%, 35%, 36%, 37%, 38%, 39%, 40%, 41%, 42%, 43%, 44%, or 45%. The ultraviolet transmittance may be, but is not limited to, 21%, 22%, 23%, 24%, 25%, 26%, 27%, 28%, 29%, 30%, 31%, 32%, 33%, 34%, or 35%. In some implementations, the visible light transmittance of the solar dark green glass greater than or equal to 70%. The visible light transmittance may be, but is not limited to, 70%, 71%, 72%, 73%, 74%, 75%, 76%, 77%, 78%, 79%, or 80%. In the present disclosure, the solar direct transmittance, the infrared transmittance, and the ultraviolet transmittance of the glass can be reduced while the thickness of the glass is thinned.

As shown in FIG. 1, a vehicle 100 is further provided in the present disclosure. The vehicle 100 includes a vehicle body 110 and a vehicle window 120. The vehicle window 120 is disposed at the vehicle body 110. The vehicle window 120 includes the solar dark green glass 121 as described in implementations of the present disclosure.

In the vehicle 100 in the present disclosure, by being equipped with the solar dark green glass 121 in the present disclosure, the glass is thinned, thereby satisfying the requirements for vehicle weight reduction, and the vehicle window 120 also satisfies the requirements for lower infrared transmittance and lower ultraviolet transmittance. In an application of the glass of the vehicle window 120, the solar dark green glass 121 in the present disclosure can be used as side window glass, rear window glass, a panoramic sunroof, etc. of the vehicle, so as to protect the privacy of the space inside the vehicle and achieve the purpose of reducing the incidence of infrared rays and ultraviolet rays, etc., such that the inside of the vehicle is more comfortable. The vehicle 100 in the present disclosure may be, but is not limited to, a sedan, a multi-purpose vehicle (MPV), a sport/suburban utility vehicle (SUV), an off-road vehicle (ORV), a pickup, a van, a bus, a truck, and the like.

In the present disclosure, the solar dark green glass may be used as a single sheet of glass, or may be manufactured into laminated glass, hollow glass, vacuum glass, etc., to use.

Implementations

In the present disclosure, mix raw materials of basic components such as silica sand, soda, dolomite, and limestone, raw materials of tinted components such as iron powder and $TiO_2$ powder, and a reducing agent, a fining agent, and the like, to prepare a glass raw material; convey the glass raw material into a melting furnace, heat the melting furnace to 1400° C. to 1600° C. (e.g., about 1500° C.) to melt the glass raw material to manufacture a glass melt, then form the glass melt into a glass plate with a predetermined thickness by a glass-plate forming method such as a float method, cut the glass plate up after annealing and cooling the glass plate, obtain glass plates in Implementations 1-11, and perform components analysis on the glass plates. For component analysis results in each implementation, reference can be made to Table 1 and Table 2.

TABLE 1

Results of tinted component analysis of glass plates in Implementations 1-11

| | Total iron expressed as $Fe_2O_3$ (%) | Redox ratio | $TiO_2$ (%) | $CeO_2$ (%) | $Cr_2O_3$ (PPM) |
|---|---|---|---|---|---|
| Implementation 1 | 1.23 | 0.24 | 0.29 | 0.011 | 16 |
| Implementation 2 | 1.32 | 0.25 | 0.23 | 0.009 | 18 |
| Implementation 3 | 1.34 | 0.46 | 0.05 | 1.96 | 15 |
| Implementation 4 | 1.39 | 0.19 | 0.05 | 2 | 15 |
| Implementation 5 | 0.91 | 0.23 | 0.23 | 0.011 | 20 |
| Implementation 6 | 0.97 | 0.49 | 0.23 | 0.009 | 10 |
| Implementation 7 | 0.97 | 0.31 | 0.04 | 0.208 | 20 |
| Implementation 8 | 0.93 | 0.37 | 0.22 | 0.008 | 10 |
| Implementation 9 | 0.93 | 0.31 | 0.23 | 0.01 | 20 |
| Implementation 10 | 0.95 | 0.17 | 0.24 | 0.009 | 10 |
| Implementation 11 | 0.93 | 0.19 | 0.23 | 0.01 | 20 |

TABLE 2

Results of tinted component analysis of glass plates in Implementations 1-11

| | CuO (PPM) | $ZrO_2$ (PPM) | SrO (PPM) | $Co_2O_3$ (PPM) | BaO (PPM) |
|---|---|---|---|---|---|
| Implementation 1 | 5 | 33 | 19 | 19 | 114 |
| Implementation 2 | 6 | 34 | 21 | 8 | 114 |
| Implementation 3 | 460 | 30 | 8 | 91 | 119 |
| Implementation 4 | 800 | 30 | 9 | 110 | 125 |
| Implementation 5 | 100 | 30 | 12 | 16 | 119 |
| Implementation 6 | 100 | 30 | 13 | 16 | 119 |
| Implementation 7 | 100 | 30 | 13 | 15 | 104 |
| Implementation 8 | 100 | 30 | 12 | 16 | 116 |
| Implementation 9 | 100 | 30 | 13 | 16 | 114 |
| Implementation 10 | 100 | 30 | 14 | 15 | 116 |
| Implementation 11 | 100 | 40 | 14 | 15 | 115 |

The glass plates in Implementations 1-11 are tested by the following method, and results are recorded in Table 3.

In the present disclosure, under International Commission on Illumination (CIE) standard illuminant A, visible light transmittance (Lta) is measured at intervals of 10 nm in a wavelength range of 380 nm-780 nm, ultraviolet transmittance (Tuv) is measured at intervals of 5 nm in a wavelength range of 300 nm-380 nm, infrared transmission (Tnir) is measured at intervals of 50 nm in a wavelength range of 780 nm-2500 nm. Solar direct transmittance (Te) represents a calculated value based on a value of light transmittance measured at intervals of 50 nm in a wavelength range of 300 nm-2500 nm. Lta, Tuv, Tnir, and Te are calculated according to ISO 9050 standard. Color indexes L*, a*, and b* are calculated according to 1976 CIE standard illuminant D65.

TABLE 3

Optical performance of glass plates in Implementations 1-11

| | Lta | Tuv | Te | Tnir | L* | a* | b* |
|---|---|---|---|---|---|---|---|
| Implementation 1 | 77.78 | 27.7 | 56.75 | 39.4 | 91.14 | −5.36 | 2.53 |
| Implementation 2 | 74.74 | 26.43 | 54.29 | 37.39 | 89.77 | −5.49 | 2.33 |
| Implementation 3 | 70.69 | 32.21 | 42.89 | 18.24 | 88.44 | −8.83 | 0 |
| Implementation 4 | 81.02 | 28.98 | 63.29 | 19.36 | 92.39 | −4.09 | 3.19 |
| Implementation 5 | 79.29 | 28.17 | 59.47 | 43.32 | 91.71 | −4.67 | 2.91 |
| Implementation 6 | 68.69 | 30.99 | 40.39 | 15.79 | 87.51 | −9.62 | 0.43 |
| Implementation 7 | 75.57 | 28.67 | 51.33 | 30.64 | 90.26 | −6.35 | 2.32 |
| Implementation 8 | 69.69 | 24.1 | 42.84 | 20.16 | 87.74 | −8.53 | 2.03 |
| Implementation 9 | 73.52 | 24.87 | 48.63 | 27.73 | 89.34 | −6.97 | 2.74 |
| Implementation 10 | 81.89 | 34.08 | 64.26 | 52.01 | 92.82 | −3.93 | 2.98 |
| Implementation 11 | 80.82 | 33.19 | 63.21 | 49.03 | 92.38 | −4.25 | 2.49 |

It can be obtained from the above table that for the solar dark green glass manufactured in the present disclosure, the solar direct transmittance thereof is substantially less than or equal to 65%, or even less than or equal to 50%; the infrared transmittance thereof is less than or equal to 45%, even less than or equal to 30%, or more even less than or equal to 20%; the ultraviolet transmittance thereof is less than or equal to 35%, even less than or equal to 30%, or more even less than or equal to 25%; the visible light transmittance thereof is greater than or equal to 70%, or even greater than or equal to 80%.

It can also be obtained from the above table that the solar dark green glass has a color characterized as follows: when calculated according to 1976 CIE standard illuminant D65, L* ranges from 87.51 to 92.82, a* ranges from −9.62 to −3.93, and b* ranges from 0 to 3.19, where L*, a*, and b* are color indexes of the solar dark green glass. According to the CIELAB color space (which is also referred to as L*a*b*, is a color space defined by CIE in 1976), a color is expressed as three values: L* for perceptual lightness, a* for two unique colors of human vision: red and green, and b* for two unique colors of human vision: blue and yellow. Specifically, L* represents lightness from black to white on a scale of 0 to 100, while a* and b* represent chromaticity with no specific numeric limits. Negative a* corresponds with green, positive a* corresponds with red, negative b* corresponds with blue, and positive b* corresponds with yellow.

The above are merely implementations of the present disclosure, and are not intended to limit the scope of the present disclosure. Any equivalent transformation made by using the description of the present disclosure, or direct or indirect application in the related technical field, shall similarly belong to the protection scope of the present disclosure.

What is claimed is:

1. A solar dark green glass, comprising a glass basic component and a glass tinted component, wherein the glass tinted component comprises, as percentages by weight:

0.8%-2.0% total iron expressed as $Fe_2O_3$, 0.01%-0.6% $TiO_2$, 0.001%-2.0% $CeO_2$, 5 ppm-150 ppm $Cr_2O_3$, 15 ppm-60 ppm $ZrO_2$, 2 ppm-1000 ppm CuO, 5 ppm-50 ppm SrO, 80 ppm-200 ppm BaO, and 5 ppm-120 ppm $Co_2O_3$; wherein a content of total iron expressed as $Fe_2O_3$ and a content of $TiO_2$ total 1.0%-2.0%, and the content of $TiO_2$ and a content of $CeO_2$ total 0.2%-2.1%; and the solar dark green glass has a thickness of 1.6 mm-2.1 mm, and solar direct transmittance less than or equal to 65%, infrared transmittance less than or equal to 45%, and ultraviolet transmittance less than or equal to 35%;

wherein when the content of $TiO_2$ is greater than or equal to 0.2%, a ratio of the content of $TiO_2$ to the content of $CeO_2$ is greater than or equal to 20.

2. The solar dark green glass of claim 1, wherein a content of CuO is 100 ppm-800 ppm.

3. The solar dark green glass of claim 1, wherein a content of $Co_2O_3$ is 8 ppm-110 ppm.

4. The solar dark green glass of claim 1, wherein the glass basic component comprises, as percentages by weight, 63%-

73% $SiO_2$, 10%-18% $Na_2O$, 4%-14% CaO, 2%-6% MgO, 0.1%-2% $Al_2O_3$, and 0.01%-1% $K_2O$.

5. The solar dark green glass of claim 1, wherein the solar dark green glass has the solar direct transmittance less than or equal to 50%, and the infrared transmittance less than or equal to 30%.

6. The solar dark green glass of claim 1, wherein the solar dark green glass has visible light transmittance greater than or equal to 70%.

7. The solar dark green glass of claim 1, wherein the solar dark green glass has a redox ratio of 0.1-0.5.

8. The solar dark green glass of claim 1, wherein when the content of $TiO_2$ is greater than or equal to 0.2%, a ratio of the content of $TiO_2$ to the content of $CeO_2$ is 20-28.

9. The solar dark green glass of claim 1, wherein a ratio of a content of CuO to a content of $Cr_2O_3$ is 5-60.

10. The solar dark green glass of claim 1, wherein a ratio of a content of BaO to a content of SrO is 5-40.

11. The solar dark green glass of claim 1, wherein a ratio of a content of BaO to a content of $ZrO_2$ is 2-8.

12. The solar dark green glass of claim 1, wherein a content of $ZrO_2$ is 30 ppm-40 ppm.

13. The solar dark green glass of claim 1, wherein the solar dark green glass is free of NiO.

14. The solar dark green glass of claim 1, wherein the solar dark green glass is formed by a float-glass-plate forming method.

15. The solar dark green glass of claim 1, wherein the solar dark green glass has a color characterized as follows: when calculated according to 1976 CIE standard illuminant D65, L* ranges from 87.51 to 92.82, wherein L* is a color index of the solar dark green glass.

16. The solar dark green glass of claim 1, wherein the solar dark green glass has a color characterized as follows: when calculated according to 1976 CIE standard illuminant D65, a* ranges from −9.62 to −3.93, wherein a* is a color index of the solar dark green glass.

17. The solar dark green glass of claim 1, wherein the solar dark green glass has a color characterized as follows: when calculated according to 1976 CIE standard illuminant D65, b* ranges from 0 to 3.19, wherein b* is a color index of the solar dark green glass.

18. A vehicle, comprising:

a vehicle body; and a vehicle window disposed at the vehicle body, wherein the vehicle window comprises a solar dark green glass, wherein the solar dark green glass comprises a glass basic component and a glass tinted component, wherein the glass tinted component comprises, as percentages by weight:

0.8%-2.0% total iron expressed as $Fe_2O_3$, 0.01%-0.6% $TiO_2$, 0.001%-2.0% $CeO_2$, 5 ppm-150 ppm $Cr_2O_3$, 15 ppm-60 ppm $ZrO_2$, 2 ppm-1000 ppm CuO, 5 ppm-50 ppm SrO, 80 ppm-200 ppm BaO, and 5 ppm-120 ppm $Co_2O_3$; wherein a content of total iron expressed as $Fe_2O_3$ and a content of $TiO_2$ total 1.0%-2.0%, and the content of $TiO_2$ and a content of $CeO_2$ total 0.2%-2.1%; and the solar dark green glass has a thickness of 1.6 mm-2.1 mm, and solar direct transmittance less than or equal to 65%, infrared transmittance less than or equal to 45%, and ultraviolet transmittance less than or equal to 35%;

wherein when the content of $TiO_2$ is greater than or equal to 0.2%, a ratio of the content of $TiO_2$ to the content of $CeO_2$ is greater than or equal to 20.

* * * * *